Figure 3:
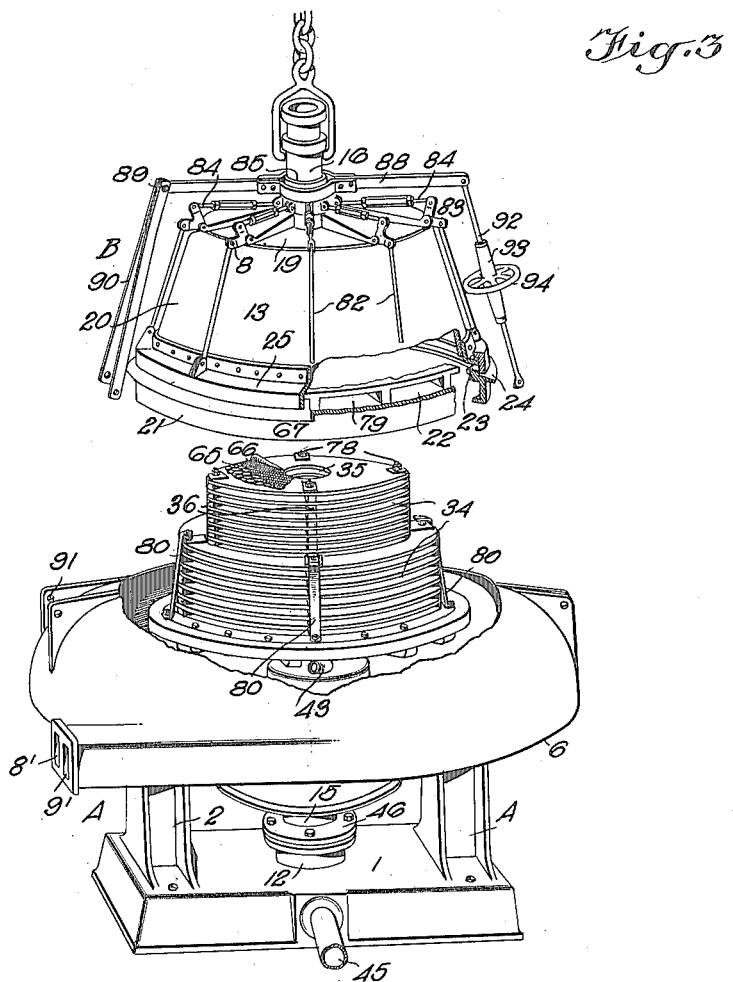

F. K. & E. F. ATKINS.
CENTRIFUGAL PRESSURE FILTER.
APPLICATION FILED NOV. 13, 1915.
1,190,842.
Patented July 11, 1916.
10 SHEETS—SHEET 1.
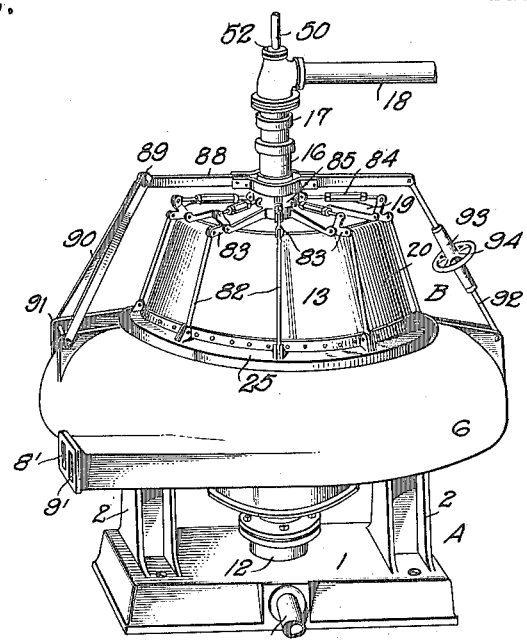
Fig. 1.
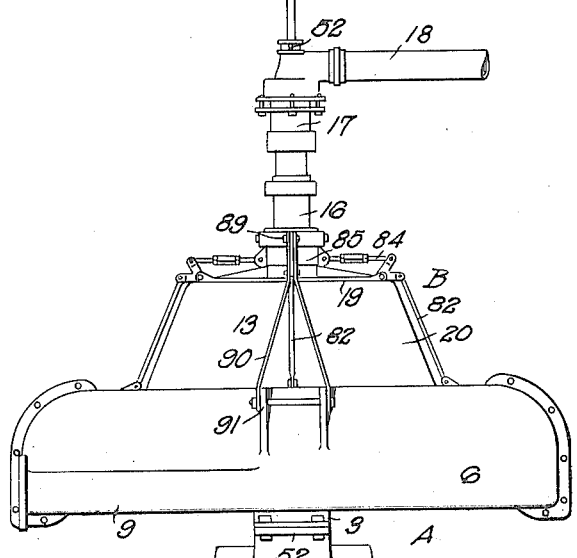
Fig. 2.
WITNESSES
INVENTORS
Frank K. Atkins
Earl F. Atkins
BY 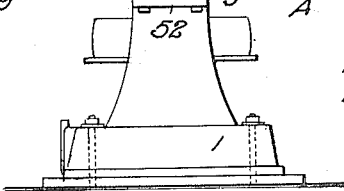
ATTORNEYS

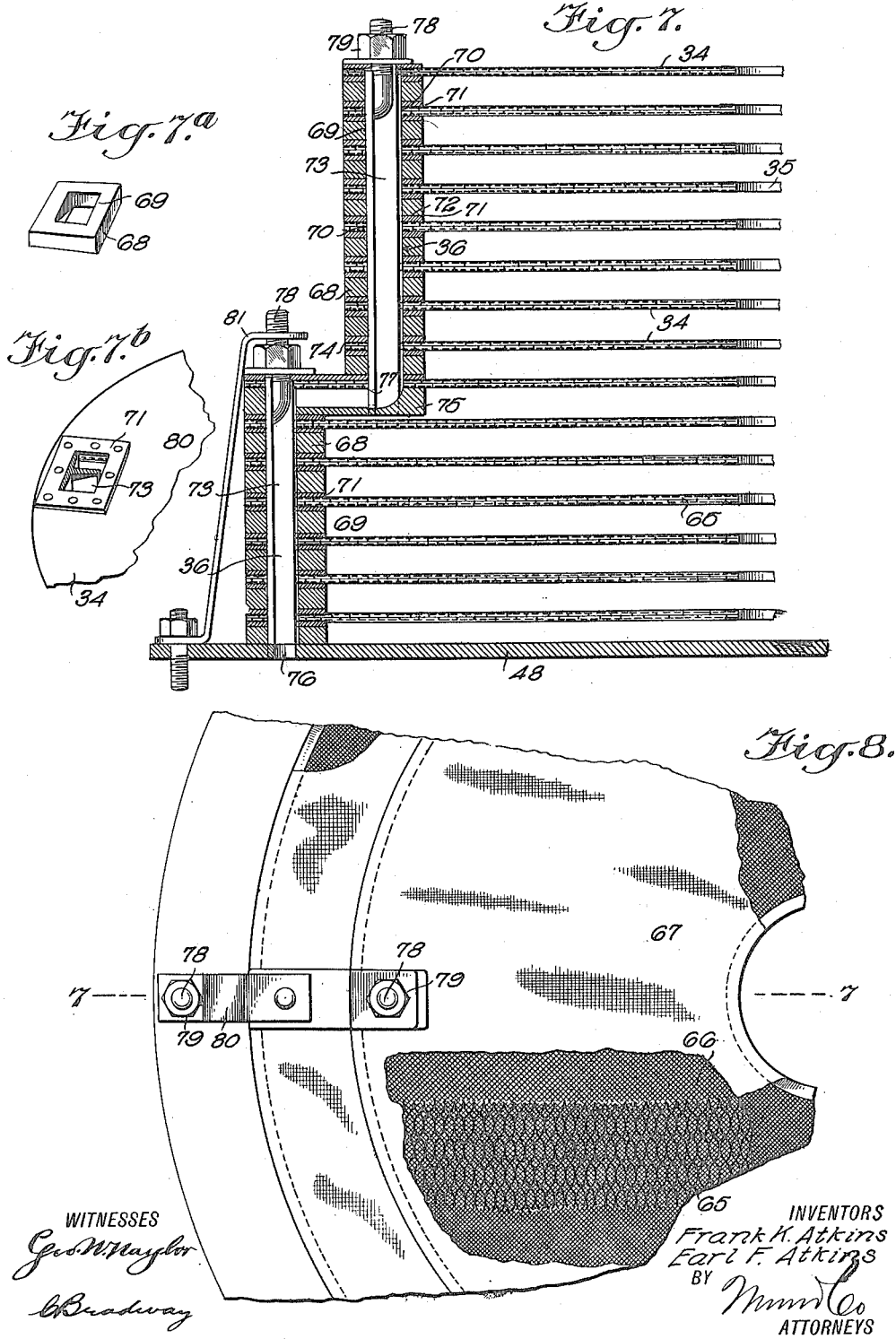

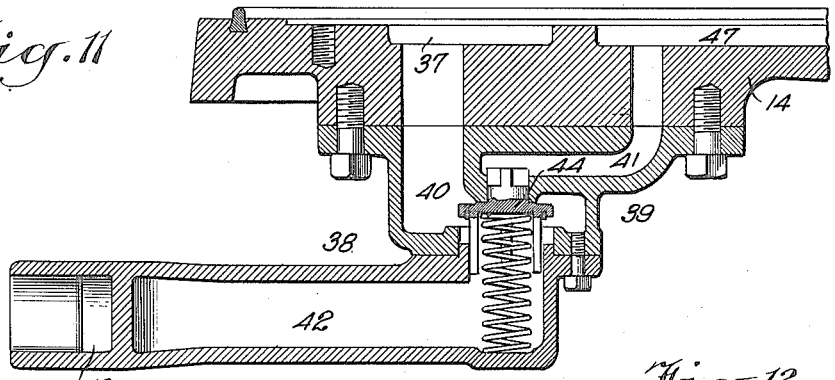
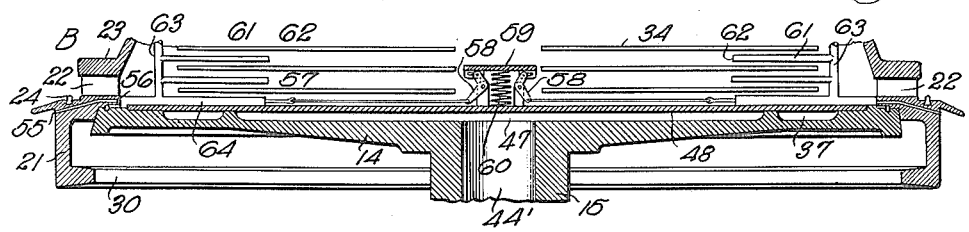
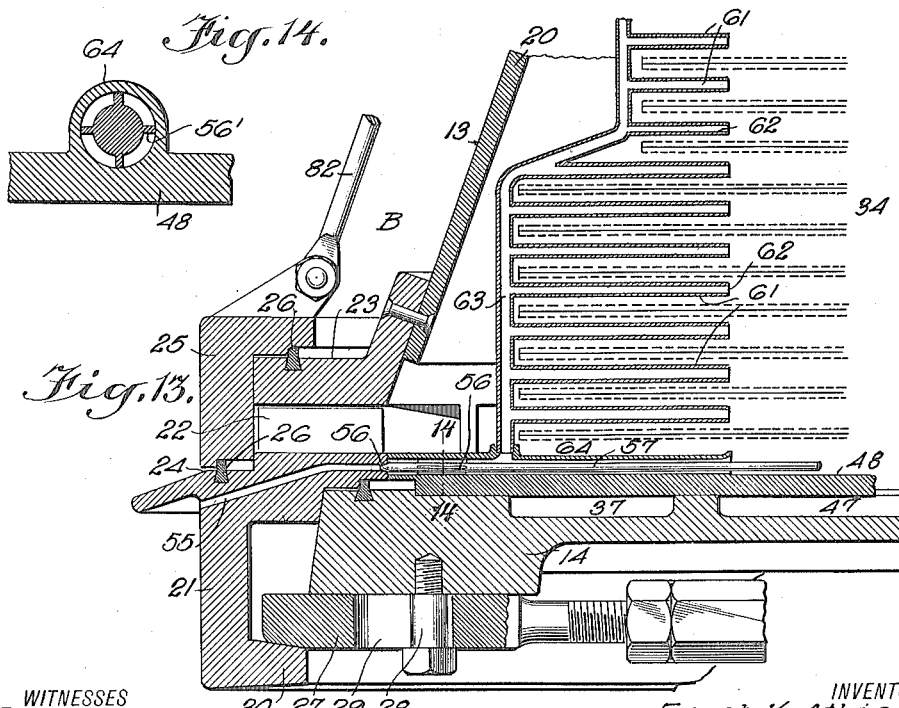

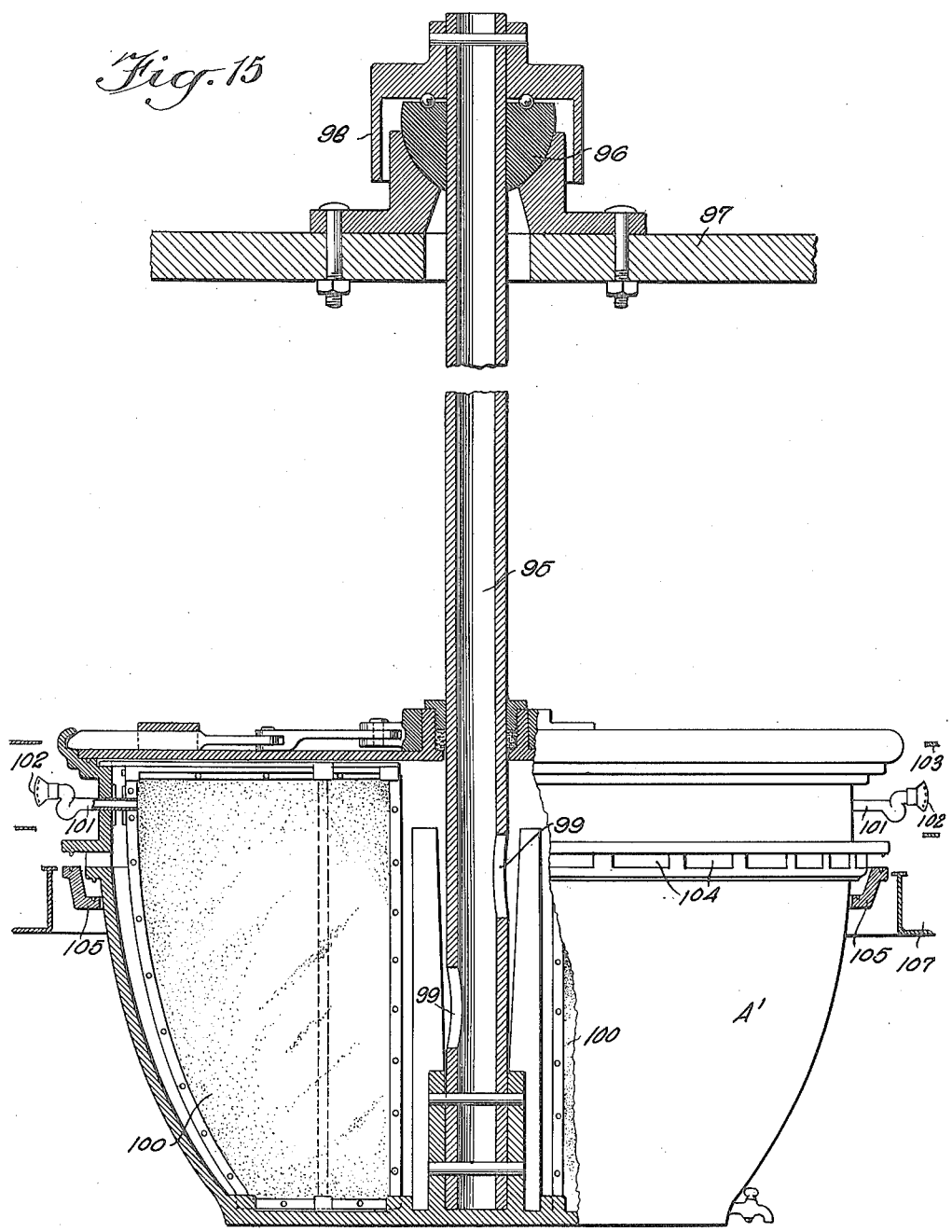

F. K. & E. F. ATKINS.
CENTRIFUGAL PRESSURE FILTER.
APPLICATION FILED NOV. 13, 1915.
1,190,842.
Patented July 11, 1916.
10 SHEETS—SHEET 10.
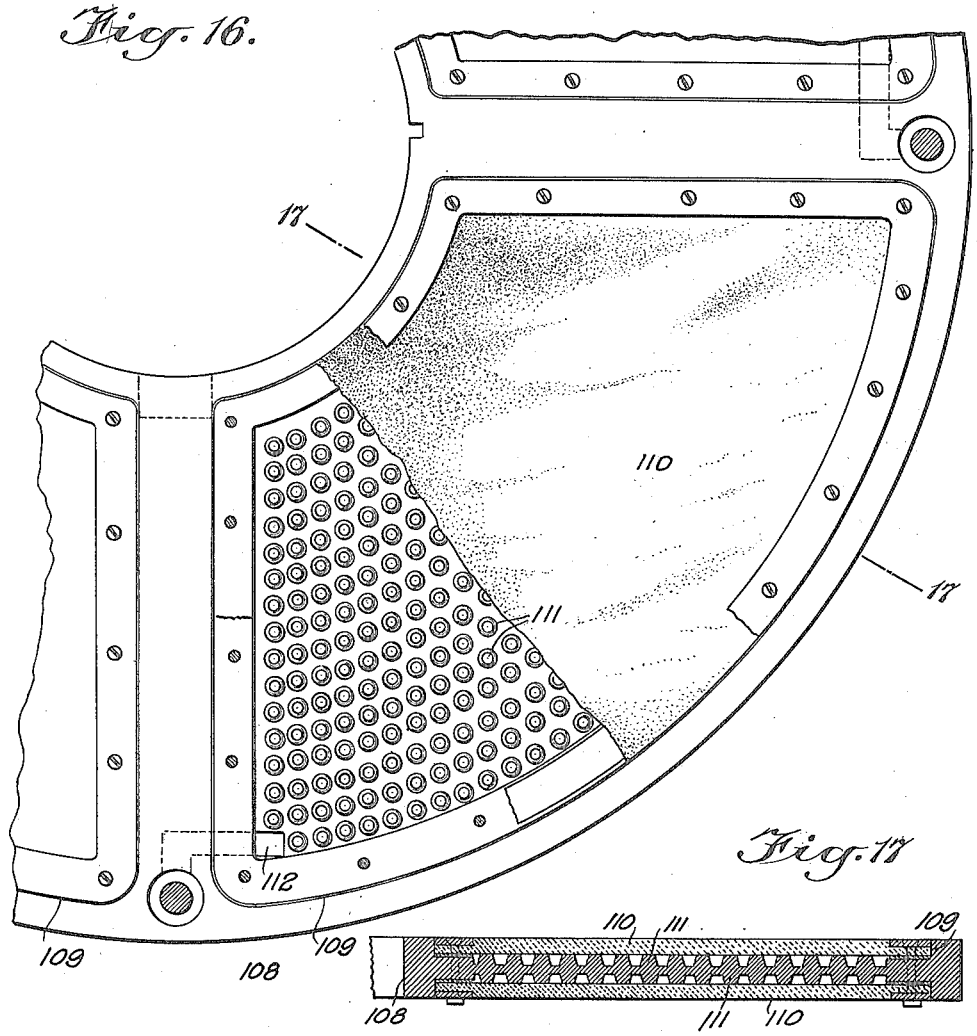
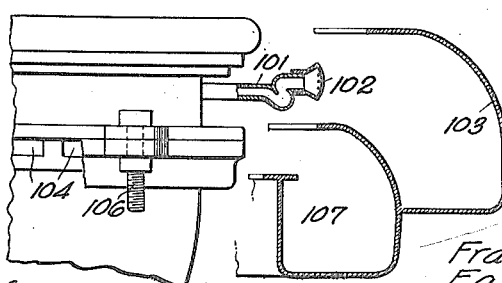
WITNESSES
INVENTORS
Frank K. Atkins
Earl F. Atkins
BY
ATTORNEYS

UNITED STATES PATENT OFFICE.

FRANK K. ATKINS AND EARL F. ATKINS, OF NEW YORK, N. Y.

CENTRIFUGAL-PRESSURE FILTER.

1,190,842.   Specification of Letters Patent.   Patented July 11, 1916.

Application filed November 13, 1915. Serial No. 61,269.

*To all whom it may concern:*

Be it known that we, FRANK K. ATKINS and EARL F. ATKINS, citizens of the United States, and residents of the city of New York, borough of Manhattan, in the county and State of New York, have invented a new and Improved Centrifugal-Pressure Filter, of which the following is a full, clear, and exact description.
This invention relates to filters, and more particularly to centrifugal pressure filters of that type disclosed in United States Letters Patent 980,859, granted to us on the third day of January, 1911, and which comprises a rotary bowl to which is supplied the liquid to be filtered and which contains a plurality of filtering elements fixed in the bowl, whereby the rotation of the latter imparts centrifugal motion to the liquid and causes the liquid to be forced into and through the filtering elements which are hollow or chambered, and the solids to be collected on the circumferential wall of the bowl from which they can be thrown off centrifugally through valved outlets when such outlets are opened after the supply of the liquid to be filtered is cut off, and from the filtering elements the filtered liquid is centrifugally discharged through outlets of suitable design.
The present invention has for its general objects to improve and simplify the construction and operation of apparatus of the character referred to so as to be reliable and efficient in use, of durable and substantial design, and capable of a large output of filtrate, with the bowl rotating at a very low speed.

A more specific object of the invention is the provision of a centrifugal pressure filter having a bowl rotating on a vertical axis and supported in bearings underneath the bowl and having a supply conduit discharging axially into the bowl from the top.

Another object of the invention is the provision of a bowl having a plurality of ports in its periphery that are normally closed by an annular valve which upon being opened while the bowl is in rotation, permits the solids to centrifugally discharge, such valve being operated by a simple, novel and effective mechanism adapted to be actuated by an attendant without the necessity of stopping the bowl.

An additional object of the invention is to provide a device for cleaning the external surfaces of the filtering elements by discharging jets of fluid thereon, such device being capable of acting as an air vent in priming the bowl.

As a further object the invention provides novel and effective means for permitting unfiltered liquid to discharge from the center of the bowl preparatory to the discharge of the solids, such means including normally closed valves which are adapted to be moved open by the said filter element cleaning device and air vent.

Furthermore, the invention aims to provide a bowl structure of readily separable parts normally locked together by wedge bolts, and on one of the parts are carried the filtering elements, the discharge means for the filtered liquid, and means for effecting an internal cleaning of the filtering elements by the forcing of a cleaning fluid reversely through the same.

A further object is the provision of an efficient, compact and simple arrangement of filtering elements and securing devices therefor, which devices constitute outlet passages for the filtered liquid.

With such objects in view, and others which will appear as the description proceeds, the invention comprises various novel features of construction and arrangement of parts which will be set forth with particularity in the following description and claims appended hereto.

Figure 4:
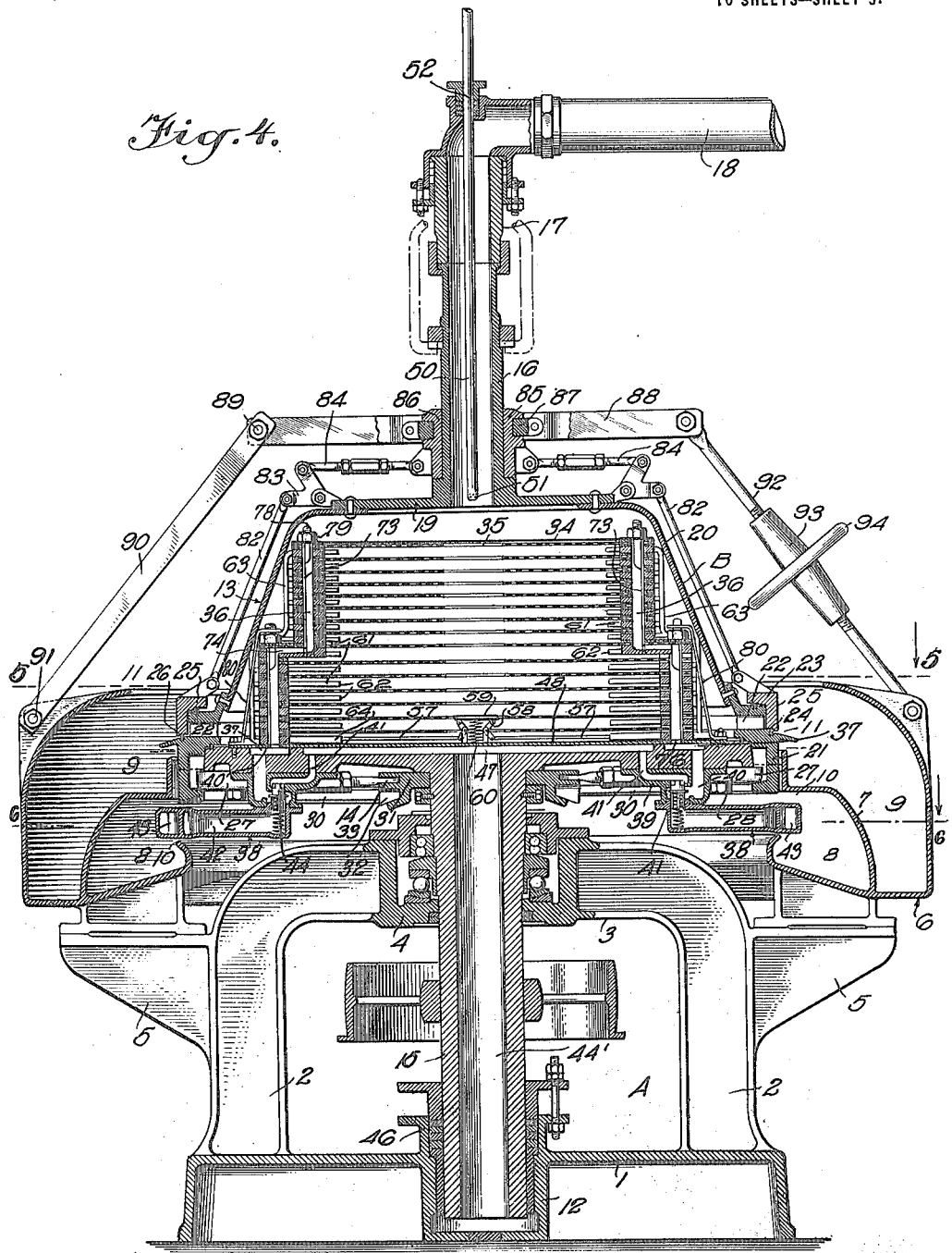
Figure 5:
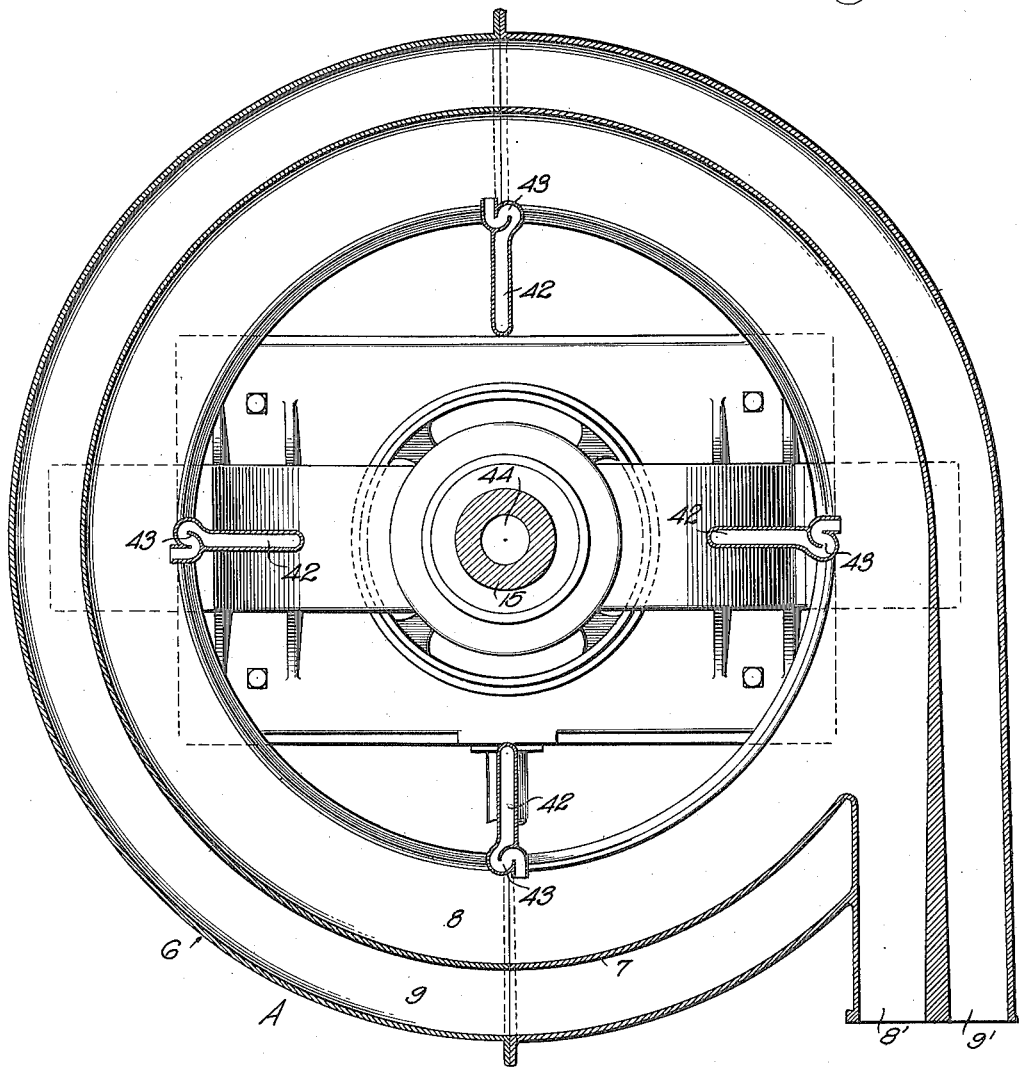
Figure 6:
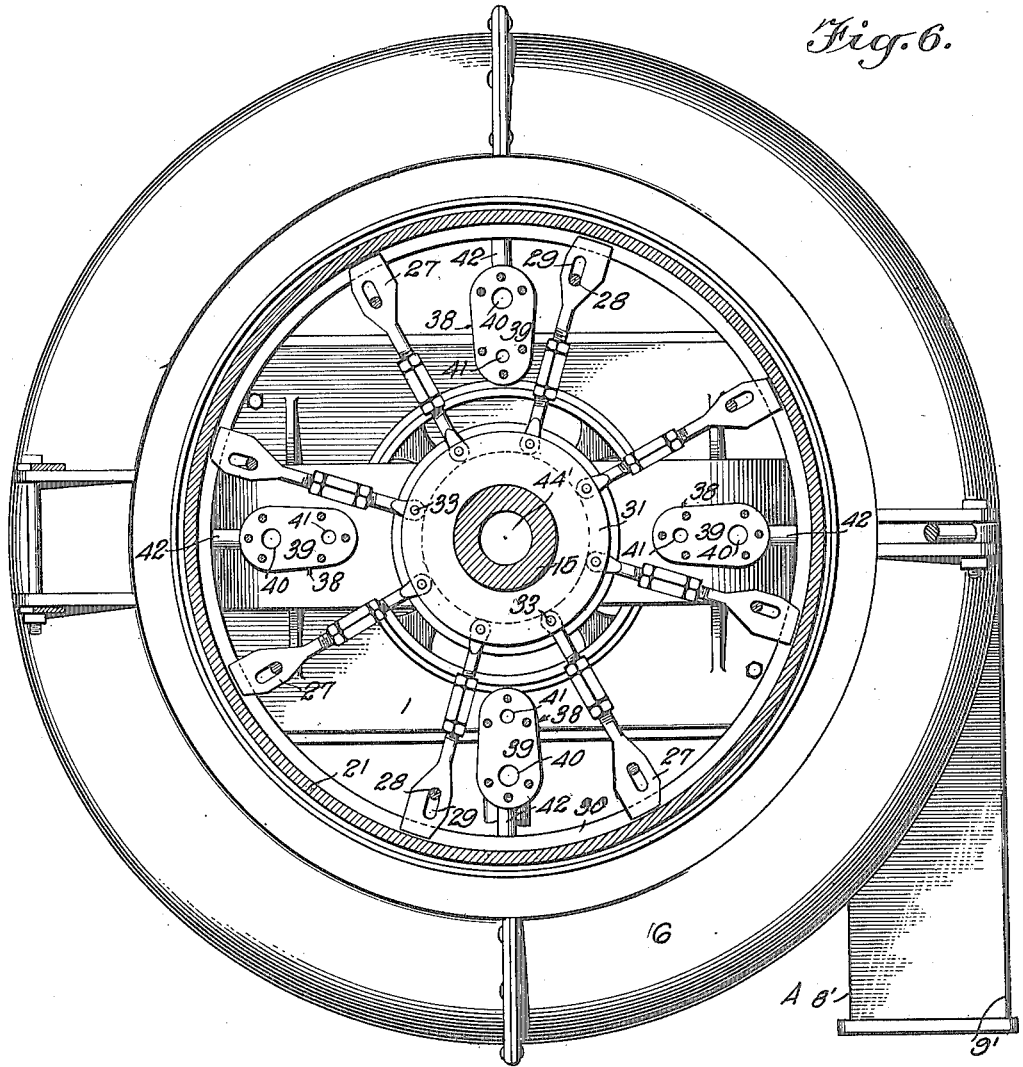
Figure 9:
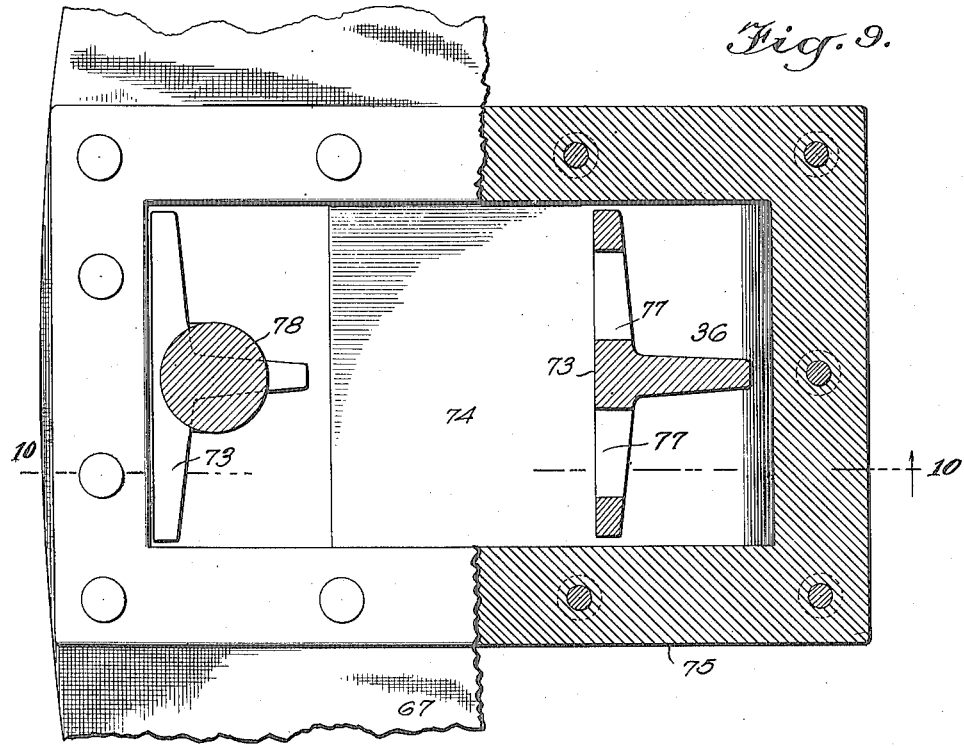
Figure 10:
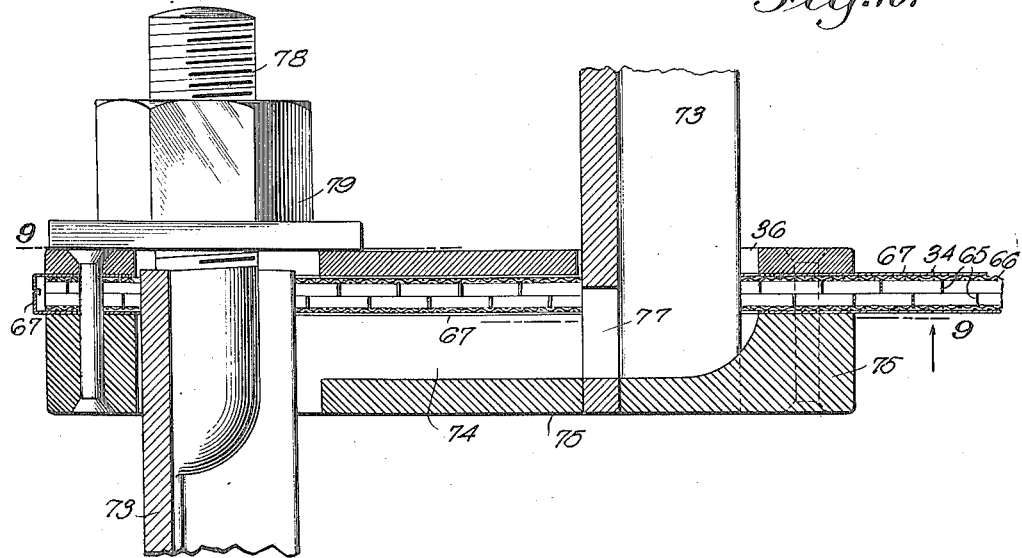

In the accompanying drawings, which illustrate certain embodiments of the invention and wherein similar characters of reference indicate corresponding parts in all the views, Figure 1 is a perspective view of the centrifugal pressure filter; Fig. 2 is a side view thereof; Fig. 3 is a perspective view of the filter with the body of the bowl raised and portions broken away to illustrate the details of construction; Fig. 4 is an enlarged central vertical section of the apparatus; Figs. 5 and 6 are horizontal sectional views on the lines 5—5 and 6—6, respectively, Fig. 4; Fig. 7 is a vertical section on the line 7—7, Fig. 8, through the filtering elements; Figs. 7$^a$ and 7$^b$ are detail views of parts of the filtering element structure; Fig. 8 is a fragmentary plan view of the filtering elements with portions broken away; Fig. 9 is a horizontal sectional view on the line 9—9, Fig. 10, through one of the means for fastening the filtering elements together and forming outlet conduits for the filtered liquid; Fig. 10 is a vertical section on the line 10—10, Fig. 9; Fig. 11 is a vertical section of one of the outlets for the filtered liquid; Fig. 12 is a fragmentary sectional view of the base portion of the bowl and illustrating the means for permitting the unfiltered liquid to discharge from the interior of the bowl prior to the opening of the latter for the discharge of the solids; Fig. 13 is an enlarged fragmentary sectional view of the base portion of the bowl illustrating the manner of connecting the parts of the bowl together, the annular valve for closing the ports through which the solids discharge, and the drain conduits for the unfiltered liquid; Fig. 14 is an enlarged sectional view on the line 14—14, Fig. 13, through the drainage outlet and the valve therefor; Fig. 15 is a view, partly in section, of a modified form of centrifugal pressure filter which is especially adapted for filtering drinking water. Fig. 16 is a fragmentary view of a modified form of filtering element in which porous plates are employed; Fig. 17 is a detail sectional view on the line 17—17, Fig. 16; and Fig. 18 is a fragmentary view showing means for causing aeration of the filtered water discharged from the filter shown in Fig. 15.

Referring to the drawings, A designates a stationary structure and B a rotary structure of the machine. The stationary structure or frame consists of a base 1 from which rises pillars or pedestals 2 which are connected together at their upper ends in the form of an arch 3, as shown in Fig. 4, in the center of which is a bearing 4, and projecting outwardly from the pillars 2 are brackets 5 on which rests a ring 6. This ring is hollow or in the form of an annular shell which is divided by a partition 7 into separate channels 8 and 9 for receiving respectively the filtered liquid and the solids, such channels having their internal walls provided with annular openings 10 and 11 respectively for receiving the filtered liquid and solids, and extending tangentially from the channels are outlets 8' and 9', as shown in Figs. 1 and 5. In the base or bed 1 is a bottom bearing 12 which axially alines with the bearing 4 and coöperates therewith to form the supporting means for the rotary element B of the machine.

The rotary element B comprises an inverted bowl-shaped body 13 and a bottom plate 14 from which depends a supporting and driving shaft 15 that is rotatable in the bearings 4 and 12, and connected with the top of the bowl body and disposed axially in alinement with the shaft 15 is a tube 16 that is connected by a slip joint 17 with a supply pipe 18 from which the liquid to be filtered is supplied to the interior of the bowl 13. The bowl body 13 is formed of a top plate 19 secured to the tube 16, a frusto-conical shell 20, and a base ring 21 which is riveted or otherwise fastened to the shell 20, as is also the plate 19. The lower portion of the bowl lies within the ring 6, with the bottom plate 14 of the bowl above the level of the channel 8. In the base ring 21 of the bowl are ports 22 through which the solids are centrifugally discharged. On the exterior of the ring are annular shoulders 23 and 24 at points above and below the ports 22, and surrounding the ported part of the base ring 21 is an annular valve 25 of L-shaped cross-section so as to engage the shoulders 23 and 24 when the valve is in closed position, there being packings 26 between the engaging surfaces of the valve and shoulders to form an effective seal.

The two parts of the bowl are fastened together by wedge bolts 27 which, as shown in Figs. 4, 6 and 13, are slidably mounted on the under side of the plate 14 to which they are secured by fasteners 28 which pass through slots 29 in the locking bolts 27. The bolts are approximately radial and their outer ends are adapted to be thrown outwardly beyond the periphery of the bottom plate 14 of the bowl to engage an internal annular flange 30 on the base ring 21 of the bowl body. When the bolts are indrawn they disengage the flange 30 and permit the bowl body to be raised off the plate 14 whenever access to the interior of the filter is desired. These locking bolts 27 are adjustably connected with a ring 31 which encircles the upper part of the shaft 15 and is rotatable thereon, and this ring is capable of being turned by any suitable implement which is insertible under the stationary channeled ring 6 and engageable in a socket 32, Fig. 4, whereby the attendant from a position to one side of the machine can lock and unlock the bolts 27. When the bolts are in locking position their pivotal connections 33, Fig. 6, are slightly beyond a dead center line position of the locking bolts, so that the bolts cannot become accidentally unlocked.

Within the bowl of the machine are horizontal filter elements 34 which are rigidly secured to the bottom plate 14 of the bowl so that the bowl body can be removed while the filter elements remain *in situ*. As the body of the bowl flares downwardly the filter elements are in at least two sets of different diameters, those of smaller diameter being in the upper part of the bowl body and those of larger diameter in the bottom. In the present instance the filter elements are disk-shaped or circular and each has a central opening 35, and as these openings aline, the liquid to be filtered can be supplied to the axial zone of the bowl and flow outwardly toward the periphery by centrifugal action, the liquid passing through the walls of the filtering elements and into the chambers thereof while the solids are thrown outwardly against the circumferential wall of the bowl. The filtering elements are arranged in superimposed relation with a free space between adjacent elements, so that the liquid can enter the elements from both the top and bottom surfaces. Adjacent the periphery of the filtering elements and at several points are conduits 36 into which all the filtering elements discharge, and each conduit 36 communicates with an annular channel 37 in the top surface of the bottom plate 14, and from this channel extend discharge nozzles 38 whereby the filtered liquid is centrifugally discharged. Each nozzle 38 comprises a casing 39 having separate passages 40 and 41, the first of which is normally in communication with the horizontal discharge portion 42, which, as shown in Fig. 5, has its outer end formed into a trap 43, and these traps discharge into the channel 8, as clearly shown in Figs. 4 and 5. The other passage 41 of the nozzle device is normally cut off by a check valve 44 from the discharge portion 42, and this valve is adapted to be forced open by fluid in the passage 41, whereby the portion 42 of the nozzle device is closed and the fluid in the passage 41 flows upwardly through the passages 40 and 36 and into the interior of the filtering elements and out through the walls thereof for cleaning the said walls. This cleaning fluid is admitted to the machine through the shaft 15 which has a bore 44', Fig. 4, and to which is connected a supply pipe 45 leading into the base 1 of the machine, as shown in Figs. 1 and 3. A stuffing box 46 is provided around the bottom of the shaft 15 so as to prevent leakage. The bore 44' communicates with a shallow chamber 47 in the top of the bottom plate 14, and with this chamber communicate the passages 41. The top of the chamber 47, as well as the top of the chamber 37, is closed by a plate or diaphragm 48 fastened to the plate 14. It will be understood that the cleaning of the filtering elements by forcing a washing fluid reversely through the elements from the interior outwardly takes place when the bowl is empty.

It may be desirable to clean the outer surface of the filtering elements 34 by discharging jets of water or other fluid against the outer surfaces thereof. For this purpose a pipe 50 extends axially through the conduit 16, and at the lower end it is provided with apertures 51 from which jets discharge horizontally. The pipe 50 slides longitudinally through a stuffing box 52 so that the lower end can be moved through the openings 35 of the filtering elements 34, whereby the latter can be successively cleaned. This cleaning operation is also performed when the bowl is empty. The pipe 50 performs two other functions, in that it serves as an air vent when first charging the bowl with liquid to be filtered. In the pipe is an air valve 53 which is adapted to be opened so that air in the bowl can escape while the latter is being initially filled. After it is filled the air valve is closed. The other function of the pipe 50 is the opening of valves for permitting unfiltered liquid to discharge from the bowl prior to the ejection of the solid material.

For the emptying of the bowl of unfiltered liquid preparatory to the removal of the solids, the base ring 21 of the bowl has drain passages 55 which are so located as to discharge into the channel 9, and these passages extend inwardly so as to communicate with the interior of the bowl, and each passage is controlled by a valve 56 formed on the outer end of a rod 57, and these rods have their inner ends connected by bell-crank levers 58 with a depressible disk 59 arranged centrally of the bowl so that the pipe 50 can be moved downwardly into engagement with the disk 59 to repress the same and cause the valves 56 to be drawn inwardly to open position, there being a spring 60 under the disk 59 so as to restore the valves to closed position when the pipe 50 is raised out of engagement with the disk. A system of drainage pipes is connected with each passage 55, each system consisting of short ducts 61 which extend horizontally inwardly between the filtering elements 34 and have open inner ends 62 which are located at such a distance inwardly from the wall of the bowl that the solids can accumulate between such inner ends and the bowl wall, while the inner ends will be communicating with the unfiltered liquid zone in the bowl. The outer ends of the ducts 61 connect with a vertical header 63 which has its lower end connected with a bottom duct 64 that leads to the passage 55, as clearly shown in Fig. 13. The valve 56 has wings 56', as shown in Fig. 14, so as to keep the valve central with respect to its seat and at the same time provide for the outflow of the unfiltered liquid.

The filtering elements 34 are preferably made of expanded sheet metal 65 similar to metal lathing, and so on opposite sides of this expanded metal sheet are plates of gauze 66, and over the gauze is canvas or other fiber filtering material 67. The expanded metal imparts hollowness to the filtering elements, and the wire gauze 66 supports the facing fabric 67, and it is through this fabric that the liquid percolates and arrests the solid matter. The inner and outer edges of the filtering elements are closed, so that liquid cannot enter the filtering elements except by passing through the filtering fabric. The filtering elements are held apart by rectangular spacers 68 which are arranged at the periphery of the elements at four points. These spacers 68 have apertures 69, and the filtering elements have apertures 70 which register with the apertures 69 in the spacers, and at the apertures of the filtering elements are rectangular reinforcing plates 71 riveted to the filtering element, and in these plates are apertures 72 registering with the apertures in the spacers and filtering elements. These registering apertures form the passages 36 by which the filtered liquid passes out of the elements. Extending through these passages 36 are T-shaped irons 73, and as there are two sets of filering elements of different diameters, the passage 36 has an offset at 74, and the T angle irons are located in the straight portions connected by the offset 74 of the outlet passages for the filtering elements. The spacer 75 between the two uppermost filtering elements of larger diameter is long enough to extend under the column of spacers interposed between the filtering elements of smaller diameter, and it is in these larger spacers that the off-sets 74 of the outlet passages are formed. The T-irons 73 in the filtering elements of smaller diameter have their lower ends anchored in the inner ends of the long spacers 75, and the T-irons in the larger filtering elements are anchored in the plate or diaphragm 48 which has apertures 76, so that the filtered liquid can flow out of the passages 36. As shown in Figs. 9 and 10, the lower ends of the T-irons 73 for the smaller filtering elements have apertures 77 in the portions disposed in the spacers 75, so that the webs on the T-irons will not interfere with the free flow of the filtered liquid. The upper ends of the T-irons are provided with threaded studs 78 on which are nuts 79 whereby the filtering elements and interposed spacers are clamped together. In order to properly guide the body of the bowl into position without damaging the filtering elements, protecting or guiding devices 80 are spaced around the periphery of the larger filtering elements. These devices 80 are in the form of metal strips which have their lower ends bolted to the plate 48 and they converge upwardly and have their upper ends 81 engaged with the threaded studs on the T-irons in the larger filtering elements. In lowering the body of the bowl downwardly the same engages these metal strips 80 and are thereby prevented from contacting with the filtering elements.

The annular valve 25 which controls the discharge of the solids from the bowl is intended to be operated while the bowl is in rotation, and for this purpose the following mechanism is employed. Connected with the top of the annular valve at spaced points are links 82 which extend upwardly from the valve at the outside of the bowl body and have their upper ends connected with bell-crank levers 83 fulcrumed on the bowl body, and these levers are connected by links 84 with a sleeve 85 which is slidable on the conduit 16. The sleeve 85 has a peripheral groove 86 in which engages a ring 87 that is fastened to a horizontal lever 88. One end of this lever is fulcrumed at 89 on the upper end of a link 90 which is in turn pivoted at 91 to the stationary part 6 of the machine, the opposite end of the lever being connected by a link 92 with the part 6 of the machine at a point diametrically opposite from the link 90, and in this link 92 is a turn-buckle 93 that has a hand-wheel 94 whereby the attendant can lengthen or shorten the link 92 and thereby raise or lower the lever 88 to axially slide the sleeve or collar 85. This movement of the collar or sleeve 85 causes the valve 25 to be raised or lowered.

In Fig. 15 is shown a simple form of centrifugal pressure filter which is especially adapted for filtering water for drinking purposes. The bowl A' is suspended from a tubular shaft 95 from the upper universal bearing 96 on a support 97, there being on the upper end of the shaft a driving pulley or equivalent means 98. The water to be filtered is supplied to the shaft 25 at the upper end thereof and it flows down into the bowl through ports 99. In the bowl are vertical radially disposed filtering elements 100 which are hollow and are faced with earthen slabs or equivalent means so that water in percolating through the slabs will be filtered. The filtered water is discharged through outlet nozzles 101 which have on their outer ends perforated devices 102 whereby the water is sprayed as it discharges, and being sprayed into air in the surrounding channel 103, the water is aerated and rendered palatable. In the periphery of the bowl are spaced ports 104 normally closed by an annular valve 105, such valve being clamped in position by bolts 106, as shown in Fig. 18. By unscrewing the nuts on the bolts the valve is lowered to open position, as shown in Fig. 15, and when so positioned solid matter will be centrifugally discharged from the bowl as the latter rotates into a surrounding channel 107.
In Figs. 16 and 17 another type of horizontal filtering element is disclosed, the same comprising a metal frame 108 which has superficial recesses 109 in which are fastened earthen slabs 110. In the recesses are spaced lugs 111 against which the slabs 110 are clamped. These lugs provide spaces or passages between the slabs so that the filtered water passing through the slabs can pass out, there being outlet apertures 112 in the corners of the recesses for the outflow of the filtered liquid.

From the foregoing the process functional to this machine will be readily understood. The unfiltered solution is fed into the bowl under pressure from a main or a pump while the machine is revolving, which results in compounding with the pressure so applied the direct pressure derived from the centrifugal force imparted to the materials within the bowl, together with such suction pressure as is derived from the vacuum condition interior to the filtering elements resulting from the traps in the outlets therefrom. The filtered solution, it will be observed, is drawn off from the outer border of the filtering elements, which, in view of the vacuum condition therein and the application of centrifugally discharging the filtrate, permits the liberation thereof under the most favorable conditions possible to be had. Furthermore, the filtering elements being spaced as found most expedient, with the open spaces between them extending from the center to the periphery thereof, and revolving while in contact with the unfiltered solution, which is continuously fed in and the filtrate drawn off during the process of filtration, results in imparting to the materials less rotary speed than is imparted to said elements, which necessarily scours therefrom the greater portion of the solids that would tend to collect on the surface thereof, and such solids are then deposited by the centrifugal force on the bowl wall. This leaves only a thin slimes coating on the filter cloth, and permits rapid percolation under the pressure so applied, in contradistinction of the methods employed by all stationary filters, which build up a cake of solids continuously on the filtering medium with its stubborn resistance to percolation. This gives the present machine large capacity.

The improvements allow of discharging the solids centrifugally and resuming filtration without stopping the bowl; of draining the bowl of its charge of liquid, making a dry cake, when desired; of surface and reverse washing of the filter cloth, either separately or concurrently, and of using centrifugal force to aid in throwing the particles of solids from the filter cloth simultaneously therewith, which effectually cleans the same within the bowl. Moreover, the release of the filtrate through the revolving outlets presents the opportunity to aerate the water and thereby remove any unpleasant taste or odor that may pertain thereto—a highly important feature when the water is desired for drinking and domestic purposes.

Having thus described our invention, we claim as new and desire to secure by Letters Patent:

1. A centrifugal pressure filter including a bowl rotatable on a vertical axis having ports for the discharge of solids, filtering means in the bowl, and a single vertically movable valve common to and normally closing all the ports.

2. A centrifugal pressure filter including a rotary bowl having a flaring peripheral wall, ports in the portion of the wall of largest diameter for the discharge of solids, a normally closed valve surrounding the bowl to open or close all the ports, and filtering means within the bowl.

3. A centrifugal pressure filter including a rotary bowl having spaced ports in its peripheral wall for the discharge of solids, and an annular valve common to and normally closing all the ports.

4. A centrifugal pressure filter including a rotary bowl having spaced ports in its peripheral wall for the discharge of solids, and an annular valve common to and normally closing all the ports, said valve being located outside the bowl.

5. A centrifugal pressure filter including a rotary bowl having spaced ports in its peripheral wall for the discharge of solids, an annular valve common to and normally closing all the ports, said valve being located outside the bowl, and means for axially moving the valve to open or close the ports.

6. A centrifugal pressure filter including a rotary bowl having ports for the discharge of solids, an annular valve surrounding the bowl and normally closing the ports, a system of levers and links connected at spaced points with the valve and rotatable with the bowl for operating the valve, and actuating means non-rotatable with the bowl for operating the said system.

7. A centrifugal pressure filter including a rotary bowl having ports for the discharge of solids, a central conduit for supplying to the bowl the solution to be filtered, an axially movable element on the conduit, a valve surrounding the bowl at the ports and normally closing the latter, and means connected with the valve and the said element for opening and closing the valve by the axial movement of the element.

8. A centrifugal pressure filter including a rotary bowl having ports for the discharge of solids, a central conduit for supplying to the bowl the solution to be filtered, an axially movable element on the conduit, a valve surrounding the bowl at the ports and normally closing the latter, means connected with the valve and the said element for opening and closing the valve by the axial movement of the element, said element being rotatable with the bowl, and a stationary lever having a slip connection with the element and adapted to axially move the same.

9. A centrifugal pressure filter including a rotary bowl having ports for the discharge of solids, a central conduit for supplying to the bowl the solution to be filtered, an axially movable element on the conduit, a valve surrounding the bowl at the ports and normally closing the latter, means connected with the valve and the said element for opening and closing the valve by the axial movement of the element, said element being rotatable with the bowl, a stationary lever having a slip connection with the element and adapted to axially move the same, and means including screw-connected parts for operating the lever.

10. A centrifugal pressure filter including a rotary bowl having discharge ports in its peripheral wall, an annular stationary channel surrounding the bowl to receive the solids discharged centrifugally from the ports, valve means for opening and closing the ports and carried by the bowl, and operating means mounted on the said channel and operatively connected with the valve means for actuating the same while the bowl rotates.

11. A centrifugal pressure filter including a rotary bowl having discharge ports in its peripheral wall, an annular stationary channel surrounding the bowl to receive the solids discharged centrifugally from the ports, an annular valve surrounding the bowl and normally closing the ports, means mounted on the bowl and connected with the valve for actuating the same, a stationary lever having a slip connection with the said means, a link mounted on the channel and on which the lever at one end is fulcrumed, and means connected with the opposite end of the lever and with the channel and including screw-connected parts for operating the lever.

12. A centrifugal pressure filter including a bowl having ports in its wall, annular shoulders on the bowl at opposite sides of the ports, an annular valve for closing the ports, and packings between the valve and the said shoulders.

13. A centrifugal pressure filter comprising a rotary bowl, an axially disposed supply conduit for delivering to the center of the bowl the liquid to be filtered, means in the bowl for filtering the liquid, and means extending into the conduit to form an air vent for the interior of the bowl.

14. A centrifugal pressure filter comprising a rotary bowl, an axially disposed supply conduit for delivering to the center of the bowl the liquid to be filtered, means in the bowl for filtering the liquid, a pipe extending within and slidable longitudinally of the conduit for discharging streams of fluid against the filtering means when the bowl is empty, for cleaning the filtering means, and an air valve connected with the said pipe at a point outside the conduit for permitting air to escape from the bowl during the priming of the latter with the liquid to be filtered.

15. A centrifugal pressure filter comprising a rotary bowl against the circumferential wall of which the solids accumulate, means for supplying to the bowl the liquid to be filtered, filtering means in the bowl, valve means for permitting the liquid in the interior of the bowl to discharge therefrom independently of the filtering means, and valve means through which the solids centrifugally discharge after the first-mentioned valve means has been opened.

16. A centrifugal pressure filter comprising a rotary bowl against the circumferential wall of which the solids accumulate, means for supplying to the bowl the liquid to be filtered, filtering means in the bowl, valve means for permitting the liquid in the interior of the bowl to discharge therefrom independently of the filtering means, valve means through which the solids centrifugally discharge after the first-mentioned valve means has been opened, said first-mentioned valve means being located within the bowl, and a device arranged to operate the first-mentioned valve means from a point within the bowl.

17. A centrifugal pressure filter comprising a rotary bowl against the circumferential wall of which the solids accumulate, means for supplying to the bowl the liquid to be filtered, filtering means in the bowl, valve means for permitting the liquid in the interior of the bowl to discharge therefrom independently of the filtering means, valve means through which the solids centrifugally discharge after the first-mentioned valve means has been opened, said first-mentioned valve means being located within the bowl, and a device movable axially of the bowl to operate the first-mentioned valve means and form a conduit from which a cleaning fluid discharges against the filtering means for cleaning the same when the bowl is empty.

18. A centrifugal pressure filter comprising a rotary bowl to which is supplied the liquid to be filtered, filtering means therein, conduits arranged within the bowl and extending toward the center thereof, whereby the solids can accumulate on the interior of the bowl while the inner ends of the conduits lie within the region of the liquid within the bowl, outlets in the periphery of the bowl for the said conduits, valves controlling the outlets, whereby the liquid can discharge independently of the filtering means, and means for permitting the solids to discharge from the bowl after the said valves have been opened.

19. A centrifugal pressure filter comprising a rotary bowl to which is supplied the liquid to be filtered, filtering means therein, conduits arranged within the bowl and extending toward the center thereof, whereby the solids can accumulate on the interior of the bowl while the inner ends of the conduits lie within the region of the liquid within the bowl, outlets in the periphery of the bowl for the said conduits, valves controlling the outlets, whereby the liquid can discharge independently of the filtering means, means for permitting the solids to discharge from the bowl after the said valves have been opened, members extending inwardly from the valves toward the center of the bowl, and means disposed axially of the bowl for actuating the members to open the valves.

20. A centrifugal pressure filter comprising a rotary bowl to which is supplied the liquid to be filtered, filtering means therein, conduits arranged within the bowl and extending toward the center thereof, whereby the solids can accumulate on the interior of the bowl while the inner ends of the conduits lie within the region of the liquid within the bowl, outlets in the periphery of the bowl for the said conduits, valves controlling the outlets, whereby the liquid can discharge independently of the filtering means, means for permitting the solids to discharge from the bowl after the said valves have been opened, members extending inwardly from the valves toward the center of the bowl, a spring-pressed element connected with the members for holding the same in valve-closed position, and a device movable axially of the bowl for actuating the element to simultaneously open the valves.

21. A centrifugal pressure filter comprising a rotary bowl against the peripheral wall of which the solids accumulate while the liquid to be filtered occupies the central region of the bowl, means in the bowl for filtering the liquid, normally-closed ports in the periphery of the bowl for permitting the solids to centrifugally discharge, conduits extending from the liquid region of the bowl to the periphery for permitting the liquid to discharge, normally closed valves for the outlet ends of the conduits, a device centrally located in the bowl and connected with the valves for simultaneously opening the same, and an element movable in the bowl for actuating the device to open the valves and constituting means for cleaning the surface of the filtering means when the bowl is empty and an air vent when the bowl is being primed with the liquid to be filtered.

22. A centrifugal pressure filter comprising a rotary bowl, an axially disposed conduit connected with the bowl for supplying thereto the liquid to be filtered, a plurality of spaced communicating filtering elements disposed within the bowl and lying transversely to the axis of rotation, means connected with the filtering elements for discharging the filtered liquid, normally closed ports adapted to be opened to permit the solids to centrifugally discharge from the bowl, and normally closed conduits communicating with the interior of the bowl for drawing off the unfiltered liquid before the solids are discharged.

23. A centrifugal pressure filter comprising a rotary bowl, an axially disposed conduit connected with the bowl for supplying thereto the liquid to be filtered, a plurality of spaced communicating filtering elements disposed within the bowl and lying transversely to the axis of rotation, means connected with the filtering elements for discharging the filtered liquid, normally closed ports adapted to be opened to permit the solids to centrifugally discharge from the bowl, a system of conduits extending into the space between the filtering elements for drawing off the unfiltered liquid before the solids are discharged, and normally closed valves controlling the said system of conduits.

24. A centrifugal pressure filter comprising a rotary bowl, and spaced filtering elements disposed with their planes transverse to the axis of rotation and fixed within the bowl to rotate therewith.

25. A centrifugal pressure filter comprising a rotary bowl, spaced filtering elements disposed with their planes transverse to the axis of rotation and fixed within the bowl to rotate therewith, said filtering elements being open at the center, and means for discharging into the center of the bowl the liquid to be filtered.

26. A centrifugal pressure filter comprising a rotary bowl, means for supplying to the center of the bowl the liquid to be filtered, whereby centrifugal force is constantly acting on the liquid, filtering elements extending from the center to the periphery of the bowl, whereby the solids passing over the surfaces of the filtering elements assist in cleaning the same, a tube normally disposed outside the bowl and movable into the same, an air vent valve connected with the outer portion of the tube for permitting the air to escape from the bowl when initially charging the same, means connected with the tube for supplying water thereto, and a nozzle on the inner end of the tube for cleaning the exterior of the filtering elements by the water supplied to the tube.

27. A centrifugal pressure filter comprising a rotary bowl, chambered filtering elements secured in the bowl to rotate therewith, means for supplying to the bowl the liquid to be filtered, outlets communicating with the filtering elements for discharging the filtered liquid, and means independent of the said outlets for forcing a cleaning medium reversely through the filtering elements when the bowl is empty.

28. A centrifugal pressure filter comprising a rotary bowl, chambered filtering elements secured in the bowl to rotate therewith, means for supplying to the bowl the liquid to be filtered, outlets communicating with the filtering elements for discharging the filtered liquid, and valve devices for closing the outlets and permitting a cleaning medium to flow reversely through the filtering elements for cleaning the latter.

29. A centrifugal pressure filter comprising a rotary bowl, chambered filtering elements fixed therein, outlets communicating with the filtering elements for discharging the filtered liquid, conduits connected with the outlets for reversely forcing a cleaning medium through the filtering elements and into the bowl when the bowl is empty, and automatic valves at the juncture of the conduits with the outlets, whereby the valves will be automatically actuated by the pressure of the cleaning medium to prevent the escape of the cleaning medium through the outlets and directing it through the filtering elements.

30. A centrifugal pressure filter comprising a rotary bowl, chambered filtering elements fixed therein, outlets communicating with the filtering elements for discharging the filtered liquid, conduits connected with the outlets for reversely forcing a cleaning medium through the filtering elements and into the bowl when the bowl is empty, automatic valves at the juncture of the conduits with the outlets, whereby the valves will be automatically actuated by the pressure of the cleaning medium to prevent the escape of the cleaning medium through the outlets and directing it through the filtering elements, and means for directing a cleaning medium against the outside of the filtering elements for cleaning the outer surfaces thereof.

31. A centrifugal pressure filter comprising a rotary bowl, chambered filtering elements therein, a conduit rotating with the bowl and connected with the elements for forcing a cleaning medium through the interior of the elements, and means permanently associated with the interior of the bowl for causing a cleaning medium to pass over the outer surfaces of the filtering elements.

32. A centrifugal pressure filter comprising a rotary bowl, filtering elements fixed therein, a conduit for supplying to the bowl the liquid to be filtered, a pipe movable axially of the bowl for directing a cleaning medium against the outer surfaces of the filtering elements, an axially disposed conduit connected with the interiors of the filtering elements, and yielding normally closed valve means controlling the communication between the last-mentioned conduit and the interiors of the filtering elements, whereby the cleaning medium under pressure will force the valve means open and cause the cleaning medium to flow through the walls of the filtering elements and into the interior of the bowl when the latter is empty.

33. In a centrifugal pressure filter, the combination of a rotatable bowl having two sets of ports in its periphery, one for the outlet of solids and the other for the outlet of unfiltered liquid, separate valves for one set of ports, and a common valve for the other set.

34. In a centrifugal pressure filter, the combination of a rotatable bowl having two sets of ports in its periphery, one for the outlet of solids and the other for the outlet of unfiltered liquid, separate valves arranged within the bowl for one set of ports, and a single valve outside the bowl for the other set of ports.

35. In a centrifugal pressure filter, the combination of a rotatable bowl having two sets of ports in its periphery, one for the outlet of solids and the other for the outlet of unfiltered liquid, separate valves arranged within the bowl for one set of ports, a single valve outside the bowl for the other set of ports, and means carried by the bowl for operating the valves.

36. In a centrifugal pressure filter, a rotary element including a bowl-shaped body and a plate closing the same, wedges on the plate and engaging with the body for locking the plate and body together, and filtering means fixed with respect to the plate, whereby the body can be removed with the filtering means *in situ*.

37. In a centrifugal pressure filter, the combination of a rotatable bowl, filtering means therein, a set of ports in the periphery of the bowl for the solids, a set of outlets in the periphery of the bowl for the unfiltered liquid, an annular axially movable valve outside the bowl normally closing the first ports, and radially movable valves in the bowl for closing the second ports.

38. In a centrifugal pressure filter, the combination of a rotatable bowl, filtering means therein, a set of ports in the periphery of the bowl for the solids, a set of outlets in the periphery of the bowl for the unfiltered liquid, an annular axially movable valve outside the bowl normally closing the first ports, radially movable valves in the bowl for closing the second ports, and an axially movable means in the bowl for actuating the radially movable valves.

39. In a centrifugal pressure filter, the combination of a rotary element including a bowl and a plate removably connected together, filtering elements fastened to the plate and independent of the bowl, and outlets carried by the plate and permanently communicating with the filtering elements.

40. A centrifugal pressure filter comprising a chambered rotary structure, filtering elements fixed therein, said structure including a plate, an axially disposed conduit, a diaphragm secured to the plate and separating the conduit from the interior of the structure, and valve-controlled passages connecting the interior of the filtering elements with the space on the conduit side of the said diaphragm, whereby a cleaning medium can be forced through the conduit and passages and thence into the filtering elements for cleaning the same.

41. In a centrifugal pressure filter, the combination of a rotatable bowl, filtering means therein, a set of ports in the periphery of the bowl for the solids, a set of outlets in the periphery of the bowl for the unfiltered liquid, an annular axially movable valve outside the bowl normally closing the first ports, radially movable valves in the bowl for closing the second ports, an axially movable means in the bowl for actuating the radially movable valves, and a system of levers and links on the bowl and connected with the annular valve for actuating the same.

42. In a centrifugal pressure filter, the combination of a rotatable bowl, filtering means therein, a set of ports in the periphery of the bowl for the solids, a set of outlets in the periphery of the bowl for the unfiltered liquid, an annular axially movable valve outside the bowl normally closing the first ports, radially movable valves in the bowl for closing the second ports, spring means yieldingly holding the last mentioned valves closed, a device within the bowl for opening the spring-closed valves, and a screw means carried by the bowl for opening and closing the annular valve.

43. A centrifugal pressure filter comprising a supporting frame, a vertical shaft rotatably mounted in the frame, a chambered structure on the upper end of said shaft, said structure including a bottom plate and an inverted bowl body removably fastened to the plate and having ports in its periphery, a valve carried by the body and movable to open and close the ports, and filtering elements mounted on the said plate and having outlet conduits through which the filtrate discharges.

44. A centrifugal pressure filter comprising a supporting frame, a vertical shaft rotatably mounted in the frame, a chambered structure on the upper end of said shaft, said structure including a bottom plate and an inverted bowl body removably fastened to the plate, nozzles on the plate, filtering elements unattached to the bowl body and fastened wholly on the said plate and having outlet conduits through which the filtered liquid flows to the nozzles, and means for detachably fastening the body and plate together, whereby the body can be lifted off the plate while the filtering elements remain *in situ* on the latter.

45. A centrifugal pressure filter comprising a supporting frame, a vertical shaft rotatably mounted in the frame, a chambered structure on the upper end of said shaft, said structure including a bottom plate and an inverted bowl body removably fastened to the plate, nozzles on the plate, filtering elements unattached to the bowl body and fastened wholly on the said plate and having outlet conduits through which the filtered liquid flows to the nozzles, means for detachably fastening the body and plate together, whereby the body can be lifted off the plate while the filtering elements remain *in situ* on the latter, and a supply conduit connected with the top of the bowl body for supplying the liquid to be filtered.

46. A centrifugal pressure filter comprising a supporting frame, a vertical shaft rotatably mounted in the frame, a chambered structure on the upper end of said shaft, said structure including a bottom plate and an inverted bowl body removably fastened to the plate, nozzles on the plate, filtering elements unattached to the bowl body and fastened wholly on the said plate and having outlet conduits through which the filtered liquid flows to the nozzles, means for detachably fastening the body and plate together, whereby the body can be lifted off the plate while the filtering elements remain *in situ* on the latter, a supply conduit connected with the top of the bowl body for supplying the liquid to be filtered, said bowl body having ports in its lower portion for the centrifugal discharge of solids from the bowl, and valve means carried by the bowl body and controlling the said ports.

47. A centrifugal pressure filter comprising a supporting frame, a vertical shaft rotatably mounted in the frame, a chambered structure on the upper end of said shaft, said structure including a bottom plate and an inverted bowl body removably fastened to the plate, filtering elements mounted on the said plate and having outlet conduits through which the filtered liquid discharges, said vertical shaft forming a conduit, and valved connections between the conduit and the filtering elements for forcing reversely through the filtering elements a cleaning fluid.

48. A centrifugal pressure filter comprising a supporting frame, a vertical shaft rotatably mounted in the frame, a chambered structure on the upper end of said shaft, said structure including a bottom plate and an inverted bowl body removably fastened to the plate, filtering elements mounted on the said plate and having outlet conduits through which the filtered liquid discharges, said vertical shaft forming a conduit, valved connections between the conduit and the filtering elements for forcing reversely through the filtering elements a cleaning fluid, and a supply conduit connected with the top of the bowl body for supplying the fluid to be filtered.

49. A centrifugal pressure filter comprising a chambered body rotatable on a vertical axis, filtering means within the body consisting of groups of spaced horizontal elements, the elements of one group being of larger diameter than those of the other group, a conduit connected with the top of the body for supplying thereto the liquid to be filtered, and means located under the body for rotatably supporting the same.

50. A centrifugal pressure filter comprising a chambered rotary body flaring in one direction, filtering means within the body, and separate outlets at the larger end of the body for the filtered liquid and for the solids.

51. A centrifugal pressure filter comprising a chambered rotary body flaring in one direction, filtering means within the body, separate outlets at the larger end of the body for the filtered liquid and for the solids, and associated channels at the larger end of the body for receiving the filtered liquid and solids respectively.

52. A centrifugal pressure filter comprising a chambered rotary body flaring in one direction, filtering means within the body, separate outlets at the larger end of the body for the filtered liquid and for the solids, associated channels at the larger end of the body for receiving the filtered liquid and solids respectively, and means for discharging into the solids-receiving channel the unfiltered liquid from the interior of the body before the solids discharge.

53. In a centrifugal pressure filter, a chambered rotary body, means for supplying thereto the liquid to be filtered, a plurality of chambered filtering elements in the said body, means for fastening the elements rigidly together, and conduits common to all the filtering elements for conveying off the filtered liquid from the interior thereof, and means passing through the conduits.

54. A centrifugal pressure filter including a rotary structure composed of a bowl body and a plate, filtering elements fastened to the plate, and protecting devices associated with the filtering elements for preventing the body from engaging with the filtering elements in the assembling or disassembling of the body.

55. A centrifugal pressure filter including a chambered structure consisting of a plate and a bowl body detachably secured together, said body flaring toward the plate, sets of filtering elements fastened to the plate, the sets enlarging in diameter successively toward the plate, and means for securing the filtering elements to the plate.

56. A centrifugal pressure filter including a chambered structure consisting of a plate and a bowl body detachably secured together, said body flaring toward the plate, sets of filtering elements fastened to the plate, the sets enlarging in diameter successively toward the plate, means for securing the filtering elements to the plate and protecting devices at the circumference of the filtering elements for preventing the body from contacting with the elements during the positioning or removal of the body.

57. In a centrifugal pressure filter, a plurality of chambered filtering elements having alining apertures, a member passing through the apertures, means coöperating with the member to fasten the filtering elements together, and spacing plates having apertures through which the member passes, the apertures being larger than the cross-sectional area of the member, whereby the member and spacing plates form a discharge passage through which the filtered material from the interior of the filtering elements discharges.

58. In a centrifugal pressure filter, the combination of a rotary chambered structure including a supporting plate, filtering elements superimposed with respect to each other and the plate, said filtering elements being chambered and having adjacent their peripheries registering apertures apertured spacers between the elements and members passing through the apertures of the spacers and filtering elements to fasten the elements and spacers together and of less cross-sectional area than the apertures so as to coöperate with the spacers to form outlet conduits for the filtered liquid.

59. In a centrifugal pressure filter, the combination of a chambered structure, adjacent sets of superimposed filtering elements, one set being of larger diameter than the other and each filtering element being chambered and having apertures adjacent its periphery, apertured spacers interposed between the elements, angle irons passing through the spacers and apertures, there being separate angle irons for the separate sets of elements, the angle irons for one set being fastened to the said chambered structure and the angle irons for the other set being fastened to certain of the spacers in the adjacent set, and said spacers provided with passages, the angle irons coöperating with the spacers to form conduits which are connected together by the said spacers having passages whereby common conduits are formed for all the filtering elements.

In testimony whereof we have signed our names to this specification in the presence of two subscribing witnesses.

FRANK K. ATKINS.
    EARL F. ATKINS.

Witnesses:
 HOWARD D. ATKINS,
 WM. B. AITCHISON.